June 19, 1928.
L. A. PAINE
1,673,919
METHOD OF MEASURING VOLT AMPERES IN AN ALTERNATING CURRENT CIRCUIT
Filed Aug. 27, 1921
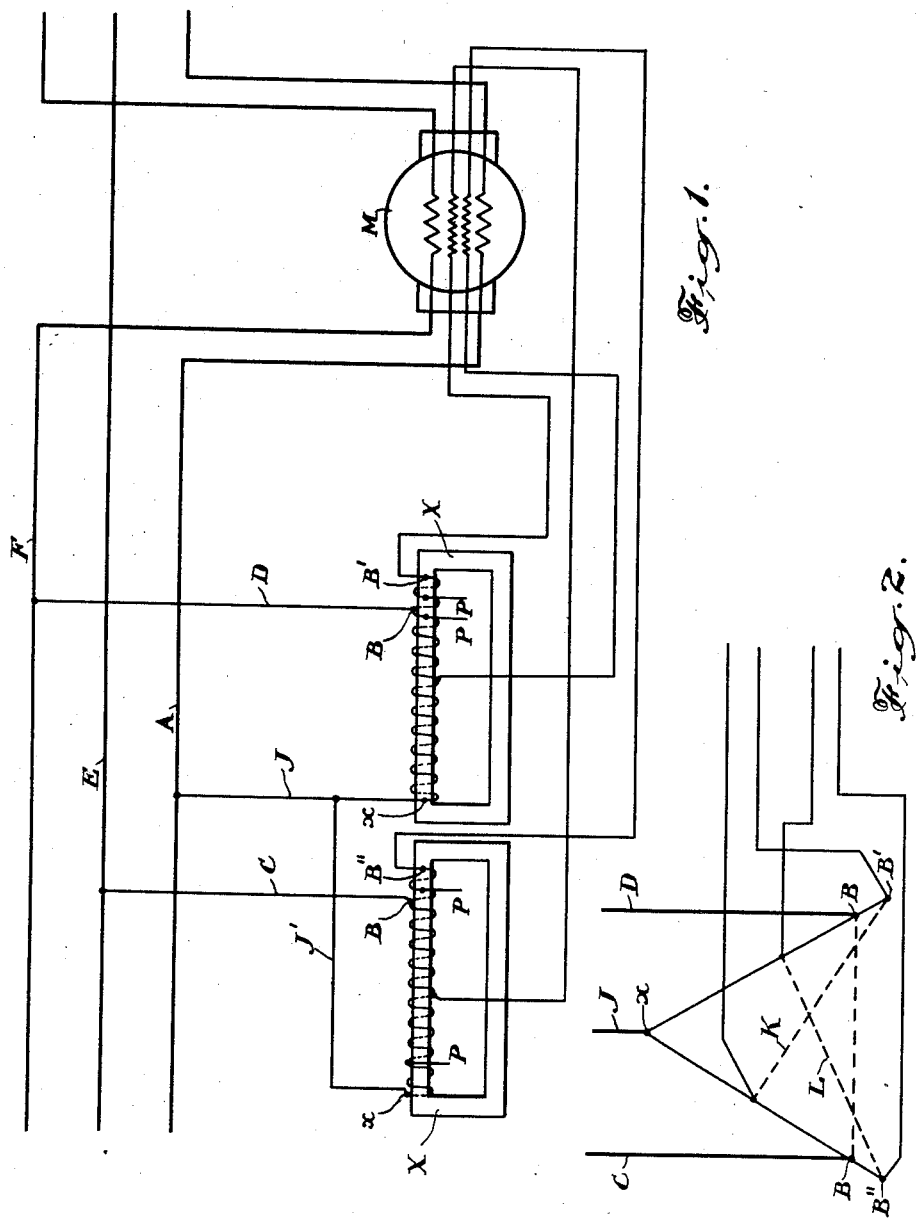
Inventor
Louis A. Paine Patented June 19, 1928.

1,673,919

UNITED STATES PATENT OFFICE.

LOUIS A. PAINE, OF TORONTO, ONTARIO, CANADA, ASSIGNOR TO LINCOLN METER COMPANY, LIMITED, OF TORONTO, ONTARIO, CANADA.

METHOD OF MEASURING VOLT AMPERES IN AN ALTERNATING-CURRENT CIRCUIT.

Application filed August 27, 1921. Serial No. 496,158.

The object of this invention is to enable the measuring of a supply of electricity in volt amperes, that is, to measure the product of the applied volts and amperes.

The principal feature of the invention consists in introducing transformer windings between the watt meter and the phases of a three phase potential supply and arranging taps to the transformer windings to effect the angular deflection or shifting of the voltages to bring them into the desired phase relation with the amperage while maintaining a constant angle between the voltages applied.

In the drawings, Figure 1 is a diagrammatic representation of a transformer showing the manner of wiring it in relation to the three phase supply.

Figure 2 is a vector diagram illustrating the angles of deflection.

In the commercial use of electric service great difficulty has been experienced in obtaining a fair record of the volt ampere demand. Careful analysis has determined that the demand charge for electric service is more justly based on volt amperes than on watts. It is a well known fact that in the normal load there is a relatively large phase angle between the volts and the amperes, that is, the power factor is far from unity. This is particularly true in power loads as distinguished from lighting loads. The power factor is largely dependent upon the kind of equipment utilized and it is important to the power distributor that the user of power utilize equipment with as high a power factor as possible but where the selection of equipment results in a bad power factor the power distributor should not be required to meet the higher cost entailed.

The introduction of the thermal demand meter has made possible the measurement of watt demands on a logarithmic basis but up to the present no method has been devised which would infallibly measure the volt ampere demand of a load. Measurements have been obtained by using two meters, reading being taken from a watt meter so connected into a circuit as to carry the line current in its current coils and have the line voltage applied to its potential circuit to indicate watts and a second watt meter with current coils connected in the same manner but having its potential circuit energized by a voltage equal to but ninety degrees out of phase with the line voltage to indicate reactive volt amperes, but the readings of these instruments must be simultaneous and for practical purposes this is impossible.

It is well known that the line current varies in phase position and in order to obtain a proper record of demand in volt amperes it is necessary to effect a change in the line voltage to change its phase angle to correspond to the lag or lead of the line current. In other words, to obtain a proper volt ampere indication a watt meter must be so connected that its current coil carries the line current and its potential circuit is energized by a voltage equal to the line voltage but in phase with the line current. While no practical method has been found of keeping the voltage constantly in phase with the current I have found that sufficiently accurate results for all practical purposes can be secured by giving the voltage supplied to the watt meter an initial fixed phase shift. This result is effected by the introduction of transformers into the potential circuit, and each transformer is connected at a separate point to a separate phase of the supply.

A practical application of the above condition has been obtained by providing auto transformers shown as X in the diagram in Fig. 1, the coils of which are connected at the points B with the leads C and D which are connected with the line wires E and F. The line wire A is connected by the lead wire J and J' and with the commencement ends $x$ of the coils X which is also represented in the vector diagram, Figure 2, by the letter $x$.

In order to adjust the magnitude and phase positions of the voltage, taps are connected to the coils X at suitable points, as indicated by B' and B" so as to produce in phase position and magnitude as represented by K and L the desired voltages that may be connected to the demand meter M. The introduction of the auto-transformer brings the voltage into phase at a pre-determined angular position of the line current and the derived voltages represented by K and L are equal to the line voltage so that the meter registers volt amperes of demand within the range of the usual power factors.

Several sets of taps P may be arranged in the transformer coils in order to provide various adjustments for differing power factors.

According to this method the variation of power factor results in a per cent variation well within the limits of commercial variation. If for instance, taps are connected assuming a power factor of .8, the power factor may vary from .9 to .7 without producing an error of over 2 percent. The characteristic error of this method is that of the cosine curve where considerable variation in angular change from zero degrees, causes only a small change in the cosine of the angle measured, that is Zero degrees 1.0 cosine of angle.
5 degrees .996 cosine of angle.
10 degrees .985 cosine of angle.
20 degrees .94 cosine of angle.

Accordingly it will be understood that there may be a considerable angular variation from the assumed angle between voltage and current and still a comparatively accurate measurement of volt amperes may be obtained.

A thermal demand meter wired through an auto-transformer in the manner described enables the power producer, after making a survey of the plant to be supplied, to set the phase angle of the voltage so as to retain the voltage substantially in phase with the line current and equal to the line voltage and thus obtain a reliable measurement of the volt amperes used.

The use of such a method also facilitates advising the consumer advantageously regarding the proper and effective use of current.

The meter used is preferably the thermal demand type as the demand is the only quantity affected by power factor. Other types of demand meters may be utilized but in using an integrating meter with a time measuring device with an auto transformer as herein described, the measurement of the k. w. hours would be affected as well as the demand measurement and the present methods of computation of charges do not justify the modification of the k. w. hours of energy consumption on account of power factor.

What I claim as my invention is:—

1. In means for measuring volt amperes in a three phase A. C. circuit, a watt meter, and stationary transformer windings each positively connected to one of two phases of the circuit, each of said windings having taps connected with the watt meter and arranged to be selected to effect an angular deflection of the voltage applied to the meter to bring it substantially into phase with the line load current and retaining substantially the same voltage magnitude.

2. In means for measuring volt amperes in a three phase A. C. circuit, a watt meter, transformer windings each connected to one of two phases of the circuit, each of said windings having their commencement ends connected with one wire of the three phase circuit and equal parts in each of the windings connected with the other wires, and selective lead connections arranged on said windings connected with a heater coil to produce a voltage applied to the meters in the desired phase relation with the amperage.

LOUIS A. PAINE.